Patented Jan. 17, 1950

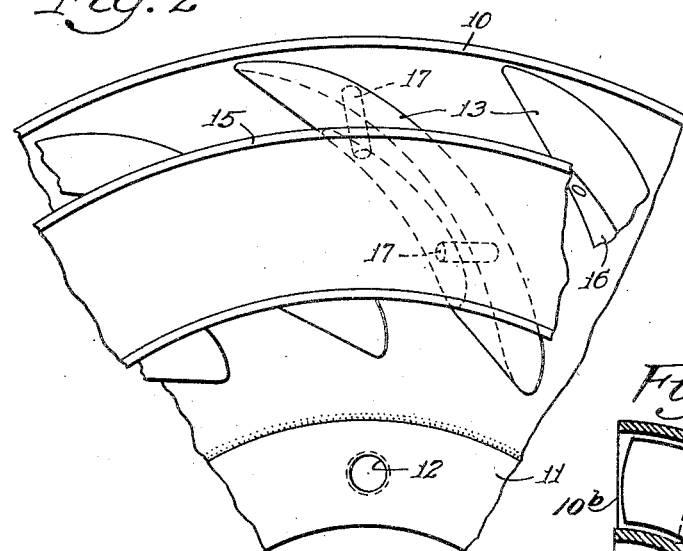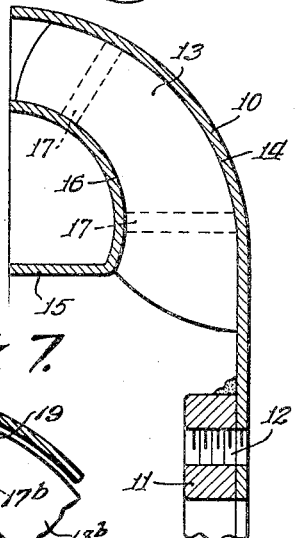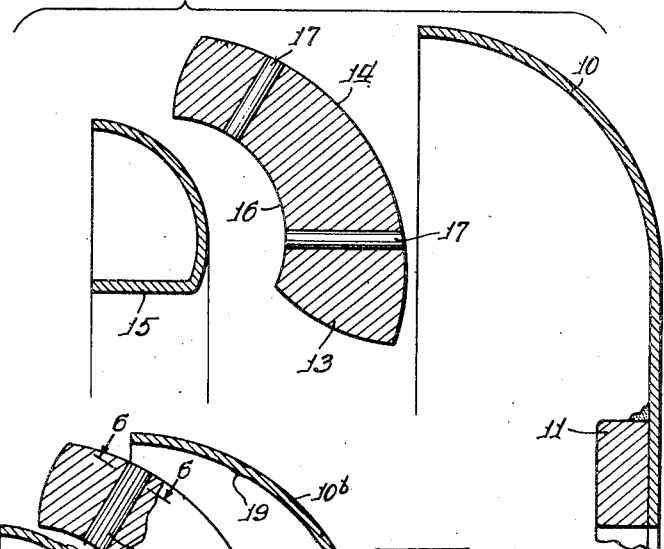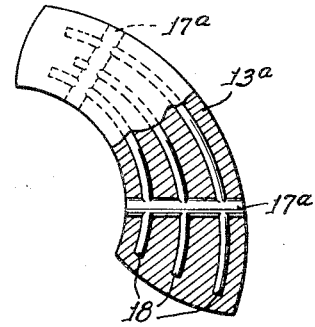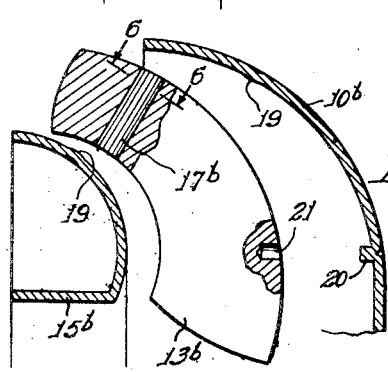

2,494,539

UNITED STATES PATENT OFFICE 2,494,539

HYDRODYNAMIC COUPLING

Augustus B. Bolender, Muncie, Ind., assignor to Borg-Warner Corporation, Chicago, Ill., a corporation of Illinois Application August 22, 1945, Serial No. 612,065

31 Claims. (Cl. 103—115)

My invention relates to hydrodynamic coupling devices and more particularly to such coupling devices which function to multiply the torque between an input and an output shaft.

Hydrodynamic coupling devices generally comprise a plurality of vaned elements including a driving element and a driven element, the drive between which is through a body of liquid. The vanes of these elements impart energy to and receive energy from the body of liquid. A fluid coupling which is not intended to multiply torque generally includes only two vaned elements while a hydrodynamic torque converter includes at least three vaned elements, a stator element which has a reaction force impressed thereon by the fluid and is held from rotation being the third element. Such hydrodynamic torque converters are shown, for example, in Schneider et al. Patent No. 2,306,758 and Schneider et al. Patent No. 2,333,680.

Considerable difficulty has been experienced in the past in assembling the hydrodynamic coupling devices and in particular these devices of the torque converter type. The vanes in the driving and driven elements of the non-torque converting type are generally flat pieces of metal; however, the vanes in the elements of a torque converting hydrodynamic device, on the other hand, generally are curved and are of substantial thickness and differ in thickness throughout their length and breadth. The vanes in the non-torque converting type of coupling are generally of the same metal as are the casings for the vanes whereby the flat vanes may be readily welded to the casings; however, the vanes in a torque converting coupling are generally of a lighter metal than are the casings of the vaned elements, and this being true, these vanes cannot as easily be welded to the casings. It is contemplated that the casing for the latter type of vaned element may preferably be stamped sheet steel while the vanes may be of cast aluminum. The aluminum forms vanes desirably light in weight, but the vanes of this metal are not readily welded to the steel casing.

It is an object of my invention to provide an improved arrangement and method for attaching the vanes to the casing of a vaned hydrodynamic element in order to form the element, which vanes are of such a material that they cannot be readily united by fusion of material or more particularly welded to the casing.

It is a more particular object of the invention to provide inserts in parts of a vaned hydrodynamic coupling element which inserts are of such material that they may readily be welded or united by fusion of material to the adjacent part in order to form the vaned element. Still more particularly, it is an object of the invention to provide pins in the vanes of a hydrodynamic coupling element, the pins being of the same material as the casing whereby the pins may be welded readily to the casing to fix the vanes within the casing. It is contemplated that the hydrodynamic coupling element may comprise in addition to the vanes and the outer casing, also an inner core ring and that the inner core ring may be also welded to the pins extending through the vanes in order to fix the core ring with respect to the vanes and the outer casing. My invention also contemplates that the pins extending through the vanes shall act as reinforcing members, and the invention contemplates the provision of ribs extending between the pins within the vanes for further strengthening the vanes if desired.

It is also an object of the invention to provide an improved method of electric welding the individual vanes to the inner and outer casings which includes localizing of the welding current.

The invention consists of the novel constructions, arrangements, devices, processes and methods to be hereinafter described and claimed for carrying out the above stated objects and such other objects as will appear from the following description of certain preferred embodiments and methods for making the same illustrated with reference to the accompanying drawing, wherein:

Fig. 1 is a cross-sectional view of a portion of an impeller or driving element of a hydrodynamic torque converter illustrating one embodiment of the invention;

Fig. 2 is an elevational view of the impeller as seen from the left in Fig. 1 or from the inner side of the impeller;

Fig. 3 is a sectional view similar to Fig. 1 with the parts of the impeller being disassembled;

Fig. 4 is a view partly in section and partly in elevation of a vane illustrating another embodiment of the invention;

Fig. 5 is a cross-sectional view of a portion of an impeller, with the parts thereof being disassembled, illustrating still another embodiment of the invention; and Fig. 6 is a sectional view on an enlarged scale taken on line 6—6 of Fig. 5.

Like characters of reference designate like parts in the several views.

Referring now to the drawing, the illustrated impeller element may be seen to comprise an outer casing 10 which is provided with a hub portion 11 welded thereto. Suitable holes 12 are provided in the hub portion and casing by means of which the impeller element may be attached to a suitable hub (not shown). The casing 10 has a plurality of vanes 13 disposed in equally spaced relation therein, and the vanes are in contact with the casing 10 on base edges 14 thereof. An inner core 15 is disposed within and spaced from the casing 10, and the core is in contact with edges 16 of the vanes which are opposite the edges 14 of the vanes.

It will be understood that the casing 10 and the core 15 are both annular and are complete rings, although only portions of the casing and core are illustrated in the drawing. The vanes 13 are equally spaced and extend completely around the casing and core ring. It will be noted that the vanes 13 are curved and have a varying and substantial thickness, and the vanes are of such form that the illustrated hydrodynamic coupling element is adapted to constitute an impeller or driving element in a hydrodynamic torque converter, such as is, for example, shown in the two Schneider patents hereinbefore mentioned. It will be understood that the illustrated impeller element is adapted to be used in connection with a vaned driven element and a vaned stator element, which constitute the three elements ordinarily found in a hydrodynamic torque converter, with the impeller element functioning to impart energy to a body of liquid in the torque converter, the driven or runner element receiving energy from the liquid and the stator element being held from rotation and functioning as a reaction element to change the direction of flow of the liquid so that the coupling functions to multiply the torque.

The casing 10 and the core ring 15 are preferably steel stampings, and in view of the fact that these two parts need not have any substantial thickness, they may be made as light as desired. The vanes 13 which have substantial thickness and which would have appreciable weight if made from steel, are preferably made of a lighter material, such as aluminum. My invention contemplates that the vanes 13 shall be welded to the casing 10 and the core 15; however, in actual practice, it has been found difficult to satisfactorily weld the aluminum vanes to the steel casing and core ring, due to the difference of the two metals. My invention solves this problem by providing steel inserts within the vanes which may be welded to the steel casing and core for fixing the vanes with respect to the casing and core, as will now be described.

A pair of spaced pins 17 are provided in each of the vanes 13, and the pins extend between the edges 14 and 16 of the vanes which edges contact the casing 10 and core ring 15 as has been described. The vanes 13 themselves may be made by any suitable method but they are preferably cast as by die-casting or sand-casting, or by use of plaster molds. The pins 17 may be cast with the vanes, or the pins may be provided in the vanes by any other suitable method, such as, for example, by first providing the holes extending through the vanes and then driving the pins into the holes.

The vanes 13, as has been described, are disposed within the casing 10 with their edges 14 in contact with the inner surface of the casing, and the core ring is disposed on the other edges 16 of the vanes in spaced relation with the casing 10 with edges 16 in contact with the inner surface of the core ring. The pins 17 terminate on the edges 14 and 16 of the vanes and are also in contact with these surfaces of the casing 10 and the core ring 15. The pins 17 at their ends are welded to the casing 10 and core ring 15 by any suitable method, such as, for example, by electric welding, and the pins when so fixed to the casing and core ring fix the vanes 13 within the casing and fix the core ring with respect to the vanes and casing.

The illustrated impeller element is assembled by placing the vanes 13 into the casing 10 in their equally spaced relation with respect to each other, and the ends of the pins 17 at the vane edges 14 in contact with the casing 10 are welded to the casing. If the pins are electric welded to the casing by passing electric current between the parts to be welded, the surface 14 is preferably coated with an insulating material leaving the pin ends bare, and this will localize the welding current at the pins and will work toward a better weld. The core ring 15 is then put into place on the edges 16 of the vanes 13, and the ends of the pins 17 at the vane edges 16 are then welded to core ring. This welding may be done in the same manner as the other ends of the pins are welded to the casing 10. The impeller element is then in completely assembled condition. The invention contemplates that the vanes 13 be made of a metal which is not easily welded to the metal of the casing and core ring, and the pins 17 in the vanes are intended to be of a metal which is easily welded to the casing and the core ring. In the preferred embodiment of the invention, the vanes 13 are of aluminum, the pins 17 are of steel and the casing 10 and core ring 15 are also of steel.

It will be apparent that the pins 17 in the vanes 13 function not only to facilitate welding of the vanes to the casing and core ring, but the pins also act as strengthening elements for the vanes. If the vanes 13 are of aluminum, this function is not so important as the aluminum vanes have strength in themselves; however, if the vanes 13 are of a more brittle material, such as a plastic, then this function of the pins 17 becomes more important. In Fig. 4 of the drawing, I have shown a vane 13a similar to the vanes 13 shown in Figs. 1 to 3 and having pins 17a similar to the pins 17 extending through the vanes. In this embodiment of the invention, I provide ribs 18 extending between the pins which strengthen the vane. It will be understood, of course, that these ribs 18 are completely within the vanes. Vanes 13a may be welded within a casing in the same manner as the vanes 13 are welded therein, namely by welding the ends of the pins 17a to the casing and core ring.

The embodiment of the invention shown in Figs. 5 and 6 is generally similar to the embodiments shown in Figs. 1 to 4. In the Fig. 5 embodiment, vanes 13b are fixed to the casing 10b and core 15b by means of pins 17b extending through the vanes. Each of the pins 17b is serrated or knurled so that the pin may have no rotation within the vane 13b and the pin thus fixes the blade 13b against rotation. The pin 17b is preferably electrically projection welded to the casing 10b and core 15b by means of projections 19 stamped into the casing 10b and core ring 15b. Projections 19 are a few thousandths of an inch in height, and when the vanes 13b are welded to the casing and core ring, these parts are placed together and held under pressure with the ends of the pins 17b being in contact with the projections 19. The vanes 13b like the vanes 13 are preferably first welded within the outer casing 10b and then the inner core ring is welded to the vanes. This projection welding functions to make a particularly good weld between the pins 17b and the casing and core ring. The vanes 13b are preferably also coated with electric insulating material on their inner and outer edges leaving only the ends of the pins 17b bare, and a good weld is also assured by this practice. The outer casing 10b is formed with a dowel 20 adapted to fit in an opening 21 within each of the vanes 13b, and when the vanes are fixed within the outer casing, this dowel 20 augments the action of the serrations on the pin 17b within the vane to prevent a turning of the vane within the outer casing.

I wish it to be understood that my invention is not to be limited to the specific constructions of hydrodynamic couplings and to the specific methods for making the same which are shown and described, except only insofar as the claims may be so limited, as it will be apparent to those skilled in the art that changes may be made without departing from the principles of the invention. In particular I wish it to be understood that the invention is not to be limited to torque converting couplings to the exclusion of non-torque converting couplings, unless the claims are so limited. Furthermore, I wish it to be understood that although the embodiments of the invention illustrated are in connection with an impeller element, the invention is not to be limited to an impeller element to the exclusion of driven and stator elements in a hydrodynamic coupling, unless the claims are so limited.

I claim:

1. In a method of making a hydrodynamic coupling element, the steps which comprise, providing a hollow casing member, providing a plurality of vanes adapted to fit in said casing member so that the vanes and casing member have abutting surfaces, said vanes being of a material which is not normally readily weldable to the casing member, providing pieces of weldable material on said vanes as portions of said abutting surfaces whereby the abutting surfaces may be readily welded together, placing the vanes in the casing member with said surfaces in contact, and securing the vanes to the casing member to fix the vanes in said casing member by fusion welding said casing member and said pieces of weldable material.

2. In a method of making a hydrodynamic coupling element, the steps which comprise, providing a hollow casing member, providing a plurality of vanes adapted to fit in said casing member, said vanes being of a substantial thickness and being of a material which is not normally readily weldable to the casing member, providing inserts in certain edge faces of said vanes which are of a material readily weldable to said casing member, placing the vanes in the casing member with said certain edge faces in contact with the casing member, and welding said inserts to said casing member to fix the vanes in the casing member.

3. In a method of making a hydrodynamic coupling element, the steps which comprise, providing a hollow annular metal casing member, providing a plurality of vanes adapted to fit in said casing member, said vanes being of a metal which is lighter in weight than the metal of said casing member and which is not normally readily weldable to the casing member, providing inserts in the edges of said vanes which are of a metal readily weldable to said casing member, and placing the vanes in the casing member with said inserts in contact with the casing member, and welding said inserts to the casing member to fix the vanes in said casing member.

4. In a method of making a hydrodynamic coupling element, the steps which comprise, providing a hollow annular steel casing member, providing a plurality of vanes adapted to fit in said casing member, said vanes being of substantial thickness and being of aluminum, providing steel inserts in certain edges of said vanes, placing the vanes in the casing member with said certain edges in contact with the casing member, and welding said steel inserts to said casing member to fix the vanes in the casing member.

5. In a method of making a hydrodynamic coupling element, the steps which comprise, providing a hollow casing member, providing a plurality of vanes adapted to fit in said casing member, providing an inner core adapted to fit on said vanes in spaced relation with said casing member, said vanes being of a material which is not normally readily weldable to the casing member and core, providing pieces of weldable material on certain of the surfaces of the vanes and with which material the core and casing member are adapted to abut and by means of which the abutting surfaces may be readily welded together, placing the vanes in the casing member and the inner core on the vanes with their surfaces in abutment, and welding the pieces on said vanes and to said casing member and core to fix the vanes in said member and secure said core to the vanes.

6. In a method of making a hydrodynamic coupling element, the steps which comprise, utilizing a hollow annular metal casing member, utilizing a plurality of vanes of substantial thickness adapted to fit in said casing member, utilizing a metal core ring adapted to fit on said vanes in spaced relation with said casing member, said vanes being made of a metal which is not normally readily weldable to the core ring and casing member, providing inserts in the vane edges which are adapted to abut on said casing member and core ring, which inserts are of a metal readily weldable to said casing member and core ring, placing the vanes in the casing member and the core ring on the vanes with said inserts in abutment with said casing member and core ring, and welding said inserts to said casing member and ring to fix the vanes in said casing member and to fix said core ring with respect to the vanes.

7. In a method of making a hydrodynamic coupling element, the steps which comprise, providing a hollow casing member, providing a plurality of vanes adapted to fit in said casing member, providing an inner core adapted to fit on said vanes in spaced relation with said casing member, said vanes being of a material which is not normally readily weldable to the casing member and core, providing pins extending through said vanes which are of a material readily weldable to said casing member and core, and assembling the vanes in the casing member and said core on said vanes with the edges of said vanes in abutment with said casing member and said core, and welding said pins to said casing member and core to fix said casing member and core and vanes together.

8. In a method of making a hydrodynamic coupling element, the steps which comprise, providing a hollow metal casing member, providing a plurality of metal vanes adapted to fit in said casing member, providing a core ring adapted to fit on said vanes in spaced relation with said casing member, said vanes being of a metal which is not normally readily weldable to the casing member and core ring and being of a substantial thickness, providing pins extending through said vanes and terminating at the edges thereof adapted to contact said core ring and casing member, said pins being of a metal which is readily weldable to said casing member and core ring, assembling said vanes in said casing member and said core ring on said vanes with the edges of said vanes in contact with said casing member and said core ring, and welding said pins at their ends to said casing member and core ring to fix the vanes and casing member and core ring together.

9. In a method of making a hydrodynamic coupling element, the steps which comprise, providing a hollow annular metal casing member, providing a plurality of metal vanes adapted to fit in said casing member, providing an annular metal core ring adapted to fit on said vanes in spaced relation to said member, said vanes being made of a metal which is lighter in weight than the metal of said casing member and core ring and is not normally readily weldable to the casing member and core ring, providing pins extending through said vanes and terminating at the edges thereof adapted to contact the casing member and core ring, said pins being of a metal readily weldable to said casing member and core ring, assembling said vanes in said casing member and said core ring on the vanes with the edges of said vanes in abutment with said casing member and said core ring, and welding said pins at their ends to said casing member and core ring to fix the vanes in said casing member and to fix said core ring on the vanes.

10. In a method of making a hydrodynamic coupling element, the steps which comprise, providing a hollow annular steel casing member, providing a plurality of aluminum vanes adapted to fit in said casing member, providing an annular steel core ring adapted to fit on said vanes in spaced relation with said casing member, providing steel pins extending through said vanes and terminating at the edges thereof adapted to be in contact with said core ring and casing member, and assembling said vanes in said casing member and said core ring on the vanes with the edges of said vanes in contact with said core ring and casing member, and welding said steel pins at their ends to said casing member and core ring to fix the vanes and member and core ring together.

11. In a vaned element of a hydrodynamic coupling device, the combination of a hollow casing member, a plurality of vanes fitting in said casing member and having face portions abutting face portions on the inside of said casing member, the face portions of said vanes and casing member being of materials not readily united together by fusion, material provided on one of the abutting face portions for each of said vanes and which may be readily united by fusion with the abutting face portion, said readily unitable material being united by fusion with the material of the abutting face portion for each of said vanes to fix the vanes in the casing member.

12. In a vaned element of a hydrodynamic coupling device, the combination of a hollow casing member, a plurality of vanes fitting in said casing member and having face portions abutting face portions on the inside of said casing member, the face portions of said vanes and casing member being of materials not readily weldable together, material provided for each of said vanes on one of said abutting face portions and which may be readily weldable to the opposite abutting face portion, said readily weldable material being welded to the abutting face portion for each of said vanes to fix the vanes in the casing member.

13. In a vaned element of a hydrodynamic coupling device, the combination of a hollow casing member, a plurality of vanes of substantial thickness fitting in said casing member and having edge face portions abutting face portions on the inside of said casing member, the face portions of said vanes and casing member being of materials not readily weldable together, and inserts provided in one of said abutting face portions for each of said vanes and being of a material readily weldable to the other abutting face portion, said insert in one of said abutting face portions for each of said vanes being welded to the other abutting face portion to fix the vanes in the casing member.

14. In a vaned element of a hydrodynamic coupling device, the combination of a hollow casing member, a plurality of vanes of substantial thickness fitting in said casing member and having edge faces abutting the inside surface of said casing member, the face portions of said vanes and casing member being of materials not readily weldable together, and inserts provided in said edge faces of said vanes and being of a material readily weldable to said casing member, said inserts being welded to said casing member to fix the vanes in the casing member.

15. In a vaned element of a hydrodynamic coupling device, the combination of a hollow annular steel casing member, a plurality of aluminum vanes of substantial thickness fitting in equally spaced relation in said casing member and having edges thereof abutting the inside surface of said casing member, steel inserts provided in said edges of said vanes and welded to said casing member to fix the vanes in the casing member.

16. In a vaned element of a hydrodynamic coupling device, the combination of a hollow casing member, a plurality of vanes fitting in said casing member and a core ring fitting on said vanes and in spaced relation with said casing member, said vanes having face portions abutting face portions on said casing member and on said core ring, the face portions of said core ring and casing member being of materials not readily weldable to the material of the face portions of said vanes, and portions of material provided on one of the abutting face portions of each of said vanes and casing member and on one of the abutting portions of each of said vanes and core ring, each of said portions of material being readily weldable to the abutting face portion and being welded thereto to fix the vanes in the casing member and the core ring to the vanes.

17. In a vaned element of a hydrodynamic coupling device, the combination of a hollow casing member, a plurality of vanes fitting in said casing member, and a core fitting on said vanes and in spaced relation to the casing member, said vanes being of substantial thickness and having edges thereof in abutting contact with surfaces of the casing member and core, said core and casing member being of materials not readily weldable to the material of said vanes, and inserts provided in one of the abutting face portions between each of said vanes and said casing member and being provided in one of the abutting face portions between each of said vanes and said core and being of a material readily weldable to the other abutting face portions, said inserts for each of said vanes being welded to the other abutting face portion to thereby fix the vanes in the casing member and said core on said vanes.

18. In a vaned element of a hydrodynamic coupling device, the combination of a hollow casing member, a plurality of vanes fitting in said casing member, a core fitting on said vanes and in spaced relation to said casing member, said vanes being of substantial thickness and having edges thereof in abutting relation with the surfaces of said casing member and core, said vanes being of a lighter material than the casing member and core and which material is not readily weldable to the materials of the casing member and core, inserts provided in said edges of the vanes and of a material which is readily weldable to the casing member and core, said inserts being welded to said casing member and core to fix the vanes in the casing member and the core on the vanes.

19. In a vaned element of a hydrodynamic coupling device, the combination of a hollow annular steel casing member, a plurality of aluminum vanes of substantial thickness fitting in said casing member, a steel core fitting on said vanes and in spaced relation with said casing member, and steel inserts provided in the edges of said vanes in contact with said casing member and core and being welded to the casing member and core to fix the vanes in the casing member and the core to the vanes.

20. In a vaned element of a hydrodynamic coupling device, the combination of a hollow casing member, a plurality of vanes of substantial thickness fitting in said casing member, a core fitting on said vanes and in spaced relation with said casing member, said vanes being of a material not readily weldable to said casing member and core, and pins extending through said vanes and terminating on edges of the vanes in contact with the casing member and core and being welded at said vane edges to the casing member and core to fix the vanes within the casing member and the core to the vanes.

21. In a vaned element of a hydrodynamic coupling device, the combination of a hollow casing member, a plurality of vanes fitting in said casing member, a core fitting on said vanes and in spaced relation to said casing member, said vanes being made of a material which is lighter in weight than the material of said casing member and core and which is not readily weldable to the material of the casing member and core, and pins extending through said vanes and terminating on edges thereof in contact with the casing member and core, said pins on their ends being welded to the casing member and core to fix the vanes in the casing member and the core with respect to the vanes.

22. In a vaned element of a hydrodynamic coupling device, the combination of an annular hollow steel casing member, a plurality of aluminum vanes fitting in said casing member, an annular steel core fitting on said vanes and in spaced relation with said casing member, and pins extending through said vanes and terminating on edges thereof in contact with said casing member and core and being welded to the casing member and core to thereby fix the vanes in the casing member and fix the core with respect to the vanes.

23. In a vaned element of a hydrodynamic coupling device, the combination of a hollow casing member, a plurality of vanes of substantial thickness fitting in said casing member, a core ring fitting on said vanes and in spaced relation with said casing member, pins extending through said vanes and terminating on edges thereof in contact with the casing member and core ring and being welded to the casing member and core ring to fix the vanes and casing member and core ring together, and reinforcing ribs extending between the pins in each of said vanes for reinforcing the vanes.

24. In a vaned element of a hydrodynamic coupling device, the combination of a hollow annular steel casing member, a plurality of aluminum vanes of substantial thickness fitting in said casing member, an annular steel core fitting on said vanes and in spaced relation to said casing member, spaced pins extending through said vanes and terminating on edges thereof in contact with said casing member and core and being welded to said casing member and core to fix the vanes with respect to the casing member and core, and steel reinforcing ribs connecting said pins in each of said vanes for reinforcing the vanes.

25. In a vaned element of a hydrodynamic coupling device, the combination of a hollow casing member, a plurality of vanes of substantial thickness fitting in said casing member, and a core fitting on said vanes and in spaced relation with said casing member, each of said vanes having a reinforcing member therein extending to the edges of the vanes in contact with the casing member and core and welded to the casing member and core to fix the vanes and casing member and core together.

26. In a vaned element of a hydrodynamic coupling device, the combination of a hollow casing member, a plurality of vanes fitting in said casing member and having face portions abutting the inner surface of said casing member, said vanes and casing member being of materials not readily weldable together, and inserts provided in the said face portions of said vanes and being of a material readily weldable to the casing member, said inserts having non-circular cross sections whereby to prevent rotation of the inserts within the vanes and being welded to the inner surface of said casing member to fix the vanes in the casing member.

27. In a vaned element of a hydrodynamic coupling device, the combination of a hollow casing member, a plurality of vanes of substantial thickness fitting in said casing member, said vanes being of a material not readily weldable to said casing member, and pins extending through said vanes and terminating on edges of the vanes in contact with the casing member and being welded at said edges to the casing member to fix the vanes within the casing member, said pins being non-circular in cross section whereby to prevent a relative rotation of the pins and vanes and to thereby prevent rotation of the vanes within the casing member.

28. In a vaned element of a hydrodynamic coupling device, the combination of a hollow casing member, a plurality of vanes of substantial thickness fitting in said casing member, a core fitting on said vanes and in spaced relation with said casing member, said vanes being of a material not readily weldable to said casing member and core, and pins extending through said vanes and terminating on edges of the vanes in contact with the casing member and core and being welded at said edges to the casing member and core to fix the vanes within the casing member and the core to the vanes, said pins being serrated whereby to prevent relative rotation of the pins within the vanes and to prevent rotation of the vanes within the casing member.

29. In a method of making a hydraulic coupling element, the steps which comprise, utilizing a casing member and a vane, said vane and casing member being adapted to fit together and have abutting surfaces, coating all but a small part of one of said abutting surfaces with electrical insulating material while the casing member and vane are separated, placing the vane and casing member together with the coated surface and the other of said abutting surfaces in contact, and passing an electric welding current through said vane and casing member to weld the vane and casing member together, said insulating material localizing the welding current to the portion of said one surface not coated with insulating material.

30. In a method of making a hydraulic coupling element, the steps which comprise, utilizing a casing member and a vane, said vane and casing member being adapted to fit together and have abutting surfaces, said vane and casing member being of materials normally not readily weldable together, providing a pin extending through said vane and terminating on its said surface adapted to abut the casing member, coating said surface of the vane, but not the end of said pin, with electrical insulating material while the vane and casing member are separated, placing said vane and casing member together with their said surfaces in contact, and passing an electric welding current through said pin and said casing member to weld the pin to the casing member and thereby fix the vane to the casing member, said insulating material localizing the welding current to the uncoated end of said pin.

31. In a method of making a hydraulic coupling element, the steps which comprise, utilizing a casing member and a vane, said vane and casing member being adapted to fit together and have abutting surfaces, said vane and casing member being of materials normally not readily weldable together, providing a pin extending through said vane and terminating on its said surface adapted to abut the casing member, providing a projection on the abutting surface of said casing member and adapted to abut the end of said pin when said vane and casing member are together, coating said surface of the vane, but not the end of said pin, with electrical insulating material while the vane and casing member are separated, placing said vane and casing member together with their said surfaces in contact and with the end of said pin in contact with said projection in said casing member, and passing an electric welding current through said pin and said casing member to weld the pin to the casing member and thereby fix the vane to the casing member, said insulating material localizing the welding current to the uncoated end of said pin.

AUGUSTUS B. BOLENDER.

REFERENCES CITED

The following references are of record in the file of this patent:

UNITED STATES PATENTS

| Number | Name | Date |
|---|---|---|
| 1,190,610 | Wallace | July 11, 1916 |
| 1,670,700 | Weed | May 22, 1928 |
| 1,734,294 | Heys et al. | Nov. 5, 1929 |
| 2,045,420 | Strickland | June 23, 1936 |
| 2,351,517 | Jandasek | June 13, 1944 |

---

Certificate of Correction

Patent No. 2,494,539     January 17, 1950

AUGUSTUS B. BOLENDER

It is hereby certified that errors appear in the printed specification of the above numbered patent requiring correction as follows:

Column 6, line 37, for the words "in said member" read *in said casing member*; column 7, line 59, for "and member" read *and casing member*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*